United States Patent [19]

Yoneda et al.

[11] Patent Number: 5,304,324
[45] Date of Patent: Apr. 19, 1994

[54] MONODISPERSED GLYCOL SUSPENSION OF FINE INORGANIC OXIDE PARTICLES HAVING EXCELLENT DISPERSION STABILITY

[75] Inventors: Tadahiro Yoneda, Ibaraki; Saburo Nakahara, Takatsuki; Mitsuo Takeda, Suita; Midori Kamo, Nishinomiya, all of Japan

[73] Assignee: Nippon Shokubai Kagaku Kogyo Co., Ltd., Osaka, Japan

[21] Appl. No.: 925,424

[22] Filed: Aug. 10, 1992

Related U.S. Application Data

[63] Continuation of Ser. No. 793,324, Nov. 15, 1991, abandoned, which is a continuation of Ser. No. 350,777, May 12, 1989, abandoned, which is a continuation-in-part of Ser. No. 21,791, Mar. 4, 1987, abandoned.

[30] Foreign Application Priority Data

| Mar. 7, 1986 | [JP] | Japan | 61-48456 |
| Sep. 12, 1986 | [JP] | Japan | 61-213725 |
| Sep. 25, 1986 | [JP] | Japan | 61-224838 |
| Jan. 22, 1987 | [JP] | Japan | 62-11248 |

[51] Int. Cl.$^5$ .............................................. B01J 13/00
[52] U.S. Cl. .................................. 252/309; 428/900; 428/908.8
[58] Field of Search .................... 252/308, 309, 314; 502/8, 10; 428/694 BL, 402, 480, 900, 908.8, 323, 331

[56] References Cited

U.S. PATENT DOCUMENTS

| 2,574,902 | 11/1951 | Bechtold et al. | 252/309 X |
| 2,657,149 | 10/1953 | Iler | 252/313.2 |
| 2,739,076 | 3/1956 | Iler | 106/308 |
| 2,765,242 | 10/1956 | Alexander et al. | 252/313.2 X |
| 2,833,723 | 5/1958 | Iler | 252/308 |
| 2,882,177 | 4/1959 | Newton et al. | 106/491 |
| 2,886,460 | 5/1959 | Alexander et al. | 252/309 X |
| 2,921,913 | 1/1960 | Alexander | 252/309 |
| 3,227,657 | 1/1966 | Haden, Jr. et al. | 252/315.2 |
| 3,336,235 | 8/1967 | Mindick et al. | 252/309 |
| 3,699,049 | 10/1972 | Pluta et al. | 252/309 |
| 3,803,046 | 4/1974 | Winyall et al. | 252/315.6 |
| 4,818,581 | 4/1989 | Katoh et al. | 428/143 |
| 4,990,400 | 2/1991 | Endo et al. | 428/331 OR |
| 5,106,681 | 4/1992 | Endo et al. | 428/323 OR |

FOREIGN PATENT DOCUMENTS

| 0075545 | 3/1983 | European Pat. Off. |
| 61-141604 | 6/1986 | Japan |

OTHER PUBLICATIONS

Patent Abstracts of Japan, Group No. C384, vol. 10, No. 335 (corresopnding to J61-141604).
Patent Abstracts Of Japan, vol. 10, No. 123 (C-344) [2180] May 8, 1989 (English Abstract of Japanese Published Patent Application 60-251106.
Van Helden, et al., "Preparation and Characterization of Spherical Monodisperse Silica Dispersions in Homaqueous Solvents", *Journal of Colloids and Interfacial Science*, 81, pp. 354–368 (1981).
Ballard, et al., "Esterification of the Surface of Amorphous Silica", *Journal of Physical Chemistry*, 65, pp. 20–25 (1961).
Chemical Abstract, 95:63614, vol. 95 (1981) p. 67, "Silica Containing Polyester Fibers".
Chemical Abstract, 98:200735, vol. 98 (1983) p. 131, "Silica Powder Homogeneously Dispersable . . . ".

Primary Examiner—Robert L. Stoll
Assistant Examiner—Daniel S. Metzmaier
Attorney, Agent, or Firm—Sherman and Shalloway

[57] ABSTRACT

A monodispersed glycol suspension having excellent dispersion stability at a pH within a wide range, comprising a monodispersed suspension in a glycol of spherical fine particles of an amorphous inorganic oxide having an average particle diameter of 0.15 to 5 micrometers and a relative particle size standard deviation of 1.0 to 1.5 and containing glycol bonded to its surface. This monodispersed suspension is useful as a raw material for the production of a polyester film having improved slipperiness.

5 Claims, 1 Drawing Sheet

Fig. 1

MONODISPERSED GLYCOL SUSPENSION OF FINE INORGANIC OXIDE PARTICLES HAVING EXCELLENT DISPERSION STABILITY

This application is a continuation of application Ser. No. 07/793,324, filed Nov. 15, 1991, now abandoned which is a continuation of application Ser. No. 07/350,777, filed May 12, 1989, now abandoned which is a continuation-in-part of application Ser. No. 07/021,791, filed Mar. 4, 1987 now abandoned.

FIELD OF THE INVENTION

This invention relates to a monodispersed glycol suspension of fine particles of an inorganic oxide having excellent dispersion stability, and to a method of improving the slipperiness of a polyester film using the monodispersed suspension. More specifically, this invention relates to a monodispersed glycol suspension in which fine particles of an inorganic oxide having a specific particle diameter, a specific shape and a specific particle size distribution are dispersed stably in a glycol solvent without forming agglomerated particles at a pH within a wide range, and a method of improving the slipperiness of a polyester film by using the monodispersed glycol suspension as a raw material for polyester production.

DESCRIPTION OF THE PRIOR ART

Fine inorganic oxide particles have been extensively used heretofore as a polymer filler and a surface-treating additive. Improvement of the slipperiness of a polymeric film or fibers by including fine inorganic oxide particles is one example of their utility.

Polyester films have been widely used in magnetic tapes, optical photography, capacitors and packaging materials. Various undesirable troubles presumably attributed to the poor slipperiness of polyester films may occur during the process of polyester film production. A polyester film used to make a magnetic tape by coating or vacuum-depositing a magnetic layer on its surface requires especially good slipperiness. If the film slipperiness is low, scratches and creases occur on the film surface during film production, coating or depositing of the magnetic layer, or film handling. This results in dropout, and the quality of the resulting magnetic tape is unsatisfactory. Furthermore, the magnetic tape product is required to have good slipperiness because it inevitably needs good travelling property. It has been the practice therefore to form a film from a polyester containing fine particles, thereby providing a roughened film surface and reducing its frictional resistance.

On the other hand, as polyester films have been produced in small thicknesses and magnetic recording has been required to have a high density and high performance in recent years, the polyester films have been required to possess two apparently contradictory properties, slipperiness and surface flatness. As a compromise for these contradictory properties, it has been proposed to form fine and uniform raised and depressed parts on the film surface.

Conventional methods proposed for this purpose include, for example, (1) a method which comprises precipitating a catalyst, a coloration inhibitor, etc. used in polyester synthesis partly or wholly during the polyester-forming reaction thereby to cause them to exist as fine particles in the polymer, and (2) a method which comprises externally adding fine inorganic particles at any desired stage of polyester synthesis.

According to the method (1), the amount or particle diameter of the particles are difficult to control and the formation of coarse particles cannot be avoided because the particles are formed during polyester synthesis.

In the method (2) commercially available materials such as silica, titanium oxide, silica-alumina, silica-magnesia, glass powder, barium sulfate, calcium carbonate, clay, mica, talc, calcium phosphate and magnesium phosphate which have an average particle diameter of 0.001 to 10 micrometers are used according to the end use of the films as the fine inorganic particles to be added (see, for example, Japanese Patent Publication No. 8216/1984 and Japanese Laid-Open Patent Publication No. 3645/1977).

These fine inorganic particles used heretofore have a broad particle size distribution and are mostly irregularly-shaped owing to the methods of their production. For example, the fine particles of silica used are silica having an average primary particle diameter of 0.02 to 0.1 mirometer obtained by thermal decomposition of silicon halides, silica obtained by crushing agglomerated masses having a size of 1 to 5 micrometers obtained from sodium silicate by the wet method, and spherical particles of silica obtained by melting the crushed particles of natural silica. However, they have irregular particle shapes, or have a very broad particle size distribution even when they are nearly spherical, or contain agglomerated particles.

According to the above methods, the slipperiness of the film surface is improved by formation of raised and depressed parts form on it. However, since the particles are non-uniform and the raised and depressed parts lack uniformity, there is a limit to the flattening of the film surface.

As a solution to the above problem of the method (2), the present inventors previously disclosed in Japanese Patent Application No. 48456/1986 that particles produced by hydrolyzing an organometallic compound in an alcoholic solution are fine inorganic oxide particles which are spherical and have a sharp particle size distribution, and by adding these particles to a polyester, an excellent slipperiness improving effect is obtained. When, however, as one embodiment of this method, the fine inorganic oxide particles are added during polyester synthesis, agglomerated particles are sometimes formed. To reduce formation of such agglomerated particles, it is effective to disperse the fine particles highly in a glycol used as a reaction material. However, complex steps such as the addition of a dispersant and ultrasonication are required in order to disintegrate the agglomerated particles. Even by such steps, the inclusion of agglomerated particles cannot be avoided.

The polyester which is an organic polymer intrinsically has no affinity for fine inorganic particles, and when it is formed into a film, voids occur around the fine particles. To avoid this problem, it was proposed to treat the surface of the fine particles with a silane coupling agent. The effect of this procedure is still insufficient.

On the other hand, various methods have been proposed previously for the production of a glycol slurry of fine particles of an inorganic oxide. They include, for example, solvent substitution of an aqueous silica sol produced from water glass by a glycol (for example, Japanese Laid-Open Patent Publication No. 47429/1981 or U.S. Pat. No. 2,921,913, etc.), and a method which comprises subjecting an aqueous silica with a silica particle diameter of not more than 0.03 μm, hydrosol produced from water glass as a raw material to solvent substitution by an organic solvent, heat-treating it in the presence of a monohydric alcohol to bond the alkoxy group chemically to silica, and removing the liquid-phase from the resulting reaction mixture thereby to form powdery silica which can be homogeneously dispersed in an organic solvent (Japanese Laid-Open Patent Publication No. 196717/1982).

However, since the method of producing these particles comprises decomposing and condensing water glass with an acid in water, it gives only those particles having a particle diameter of not more than 0.13 micrometer. Furthermore, as described at page 1, line 61 to page 2, line 5 of U.S. Pat. No. 2,921,913, an organosol such as an ethylene glycol sol prepared by using water glass as the raw material is unstable at a pH lower than 7.5, and is readily gelled or precipitated by flocculation. Accordingly, even if particles having a size above 0.13 micrometer are obtained by the above method, in order to maintain them as a stable sol, the pH of the sol must always be maintained alkaline by causing an alkali to be present in the sol. The copresence of an alkali, however, limits the range of utility of the sol. Moreover, when the ethylene glycol dispersion of fine particles obtained by the above method is added to the step of forming a polyester in a high-temperature atmosphere, the particles are very liable to flocculate.

The present inventors reproduced this method except that a glycol was used instead of the monohydric alcohol, and evaluated the dispersibility of the resulting powdery silica in the glycol. As a result, they observed many agglomerated particles in the final glycol suspension.

C. C. Ballard et al. reported in Journal of Physical Chemistry, 65, 20–25 (1961) that when a silica powder obtained from water glass was treated in ethylene glycol, the glycol could be bonded to the surface of the fine particles. A. K. Van Helden et al. reported in Journal of Colloid and Interface Science, 81, 354–368 ('81) that spherical silica particles obtained by hydrolyzing ethyl silicate in an alcohol were rendered hydrophobic by heat-treatment in the presence of stearyl alcohol. Since, however, these methods include powderization of fine particles and subsequent heat-treatment in an alcohol, agglomeration of the particles during powderization cannot be avoided. Consequently, they have the disadvantage that after the powder is heat-treated in a solvent (even if the solvent is a glycol), the resulting dispersion contains many agglomerated particles and a monodispersed suspension cannot be obtained.

Fine silica particles to the surface of which stearyl alcohol is bound have no affinity for a glycol such as ethylene glycol, and are not dispersible in it.

No monodispersed glycol suspension of fine particles has been available to date which meet all of the following requirements (1) to (5) for giving a polyester film satisfying the required novel property.
(1) The particle diameter of the fine particles should be in the desirable range.
(2) The fine particles should be spherical.
(3) The particle size distribution of the fine particles should be very narrow.
(4) The fine particles should not contain agglomerated fine particles or coarse masses of fine particles in the glycol dispersion.
(5) The glycol dispersion of the fine particles should be stable with time and to thermal shocks at a pH within a broad range even if an alkali ion or a dispersion stabilizer such as a dispersing agent is not present in the glycol dispersion.

SUMMARY OF THE INVENTION

The present invention was made in order to satisfy all of these five requirements.

It is a first object of this invention to provide a monodispersed glycol suspension of fine particles of an inorganic oxide having excellent dispersion stability.

A second object of this invention is to provide a monodispersed glycol suspension of fine particles of an inorganic oxide having s specific particle diameter range, a specific particle shape and a specific particle size distribution in a glycol solvent without formation of agglomerated particles at a pH within a wide range.

A third object of this invention is to provide a method of improving the slipperiness of a polyester film which comprises forming uniform raised and depressed parts on the surface of a polyester film by using the aforesaid monodispersed glycol suspension of fine particles of an inorganic oxide as a raw material for the polyester.

According to this invention, there is provided a monodispersed glycol suspension having excellent dispersion stability at a pH within a wide range, comprising a monodispersed suspension in a glycol of spherical fine particles of an amorphous inorganic oxide having an average particle diameter of 0.15 to 5 micrometers and a relative particle size standard deviation of 1.0 to 1.5 and containing glycol bonded to its surface.

According to another aspect of the invention, there is provided, in a method of improving the slipperiness of a polyester film which comprises using a glycol slurry of fine particles of an inorganic oxide as a raw material for polyester film formation, and preparing a polyester film containing 0.005 to 2% by weight, based on the polyester, of said fine particles, the improvement wherein the glycol slurry of the particles is the monodispersed glycol suspension described above.

BRIEF DESCRIPTION OF THE DRAWING

The attached drawing.

DESCRIPTION OF THE PREFERRED EMBODIMENTS

The monodispersed glycol suspension of this invention has excellent dispersion stability even in high fine particle concentrations. The fine particles in the monodispersed suspension satisfy all of the following characteristics.
(1) They are amorphous spherical fine particles having an average particle diameter of 0.15 to 5 micrometers and have such a sharp particle distribution that the relative standard deviation of their particle size is in the range of 1.0 to 1.5.
(2) They contain little or no agglomerated particles.
(3) Glycol is bonded to the surface of the fine particles.
(4) When the pH of a mixed slurry obtained by diluting a monodispersed glycol suspension with the same amount of deionized water is measured, the monodispersed glycol suspension is stable thermally and with time at a wide pH of 4-10.

The fine inorganic oxide particles having these properties can be obtained by a method which comprises at least the following three steps.

First step: a step of hydrolyzing a hydrolyzable organometallic compound in an aqueous solution of an alcohol which may include a glycol to be used in the second step to obtain a suspension of fine particles of an amorphous hydrated inorganic oxide in the alcoholic solution.

Second step: a step of substituting a glycol for the alcoholic solvent of the suspension to obtain a glycol suspension of the fine particles of hydrated inorganic oxide.

Third step: a step of heat-treating the glycol suspension to obtain a monodispersed glycol suspension of fine inorganic oxide particles.

The hydrolyzable organometallic compound as a raw material for fine inorganic oxide particles [to be referred to as fine oxide particles (c)] in the monodispersed glycol suspension denotes a compound of a metal such as silicon, titanium, zirconium or aluminum which contain a hydrolyzable organic group and can form a hydrate when hydrolyzed. Alkoxides of the above metals are easily available commercially and inexpensive. Such metal alkoxides are represented by the general formula $M(OR)_m$ wherein M is a metallic element, m is an integer corresponding to the valency of the element, and R is an alkyl group, preferably a lower alkyl group having up to 8 carbon atoms. Specific examples are tetramethyl silicate, tetraethyl silicate, tetraisopropyl silicate, tetrabutyl silicate, tetramethyl titanate, tetraethyl titanate, tetraisopropyl titanate, tetrabutyl titanate, tetramethyl zirconate, tetraethyl zirconate, tetraisopropyl zirconate, tetrabutyl zirconate, tetra(2-ethylhexyl) titanate, trimethyl aluminate, triethyl aluminate, triisopropyl aluminate and tributyl aluminate. They may also be those having a plurality of alkyl groups such as dimethyldiethyl silicate and diethyldibutyl titanate.

Other preferred organometallic compounds are derivatives of these alkoxides, for example low condensation products obtained by partially hydrolyzing these alkoxides, compounds of the general formula $M(OR)_m$ in which the alkoxy groups (OR) are partly replaced by a group capable of forming a chelate compound such as a carboxyl or beta-dicarbonyl group, and low condensation products obtained by partially hydrolyzing these alkoxide substituted compounds.

Other organometallic compounds include, for example, acylate compounds of titanium, zirconium or aluminum such as zirconium acetate, zirconium oxalate, zirconium lactate, titanium lactate and aluminum lactate; and chelate compounds between titanium, zirconium or aluminum and a glycol, a beta-diketone or an amino alcohol, such as titanium acetylacetonate, zirconium acetylacetonate, titanium octyl glycolate, titanium triethanol aminate and aluminum acetyl acetonate.

The fine oxide particles (c) may also be fine particles of composites formed between an oxide of silicon, titanium, zirconium and/or aluminum obtained by hydrolyzing organometallic compounds of silicon, titanium, zirconium and/or aluminum in the presence of an organometallic compound or inorganic salt of sodium, potassium, rubidium, cesium, magnesium, calcium, strontium, barium, boron, gallium, indium, tin, etc., and an oxide of another metal. The proportion of the oxide of silicon, titanium, zirconium and/or aluminum in the fine oxide particles is not particularly limited, but is preferably at least 70%.

In the first step of mixing the organometallic compound with an alcoholic solution to hydrolyze it and form a suspension of fine particles of the hydrate in the alcoholic solution, the method of mixing may be arbitrary. For example, they may be mixed at a time or portionwise. At this time, there is no particular restriction on the final concentration of the organometallic compound in the solution. Preferably, it is not more than 2 moles/liter because agglomeration of the fine hydrate particles does not appreciably occur in such final concentrations.

The alcohol in the alcoholic solution is not particularly restricted. For example, methanol, ethanol, isopropanol, butanol, isoamyl alcohol, ethylene glycol, propylene glycol, etc. may be used singly or in combination. Glycols such as ethylene glycol and propylene glycol may be the same as those used in the second step (to be referred to as the glycol (B). A minor amount of an organic solvent such as dioxane, diethyl ether, ethyl acetate, benzene, toluene and hexane may be included in the solution.

The alcoholic solution is required to contain water necessary for hydrolysis. The content of water should be controlled to a favorable range since it affects the shape or particle size of the particles. Water may be supplied as a moisture in a gaseous phase.

The hydrolysis is carried out, for example, by adding the above organometallic compound or its alcohol solution to the above alcohol solution and stirring the mixture at 0° to 100° C., preferably 0° to 50° C., for 10 minutes to 100 hours. At this time, in order to control the rate of hydrolysis, a catalytic component, for example a cation such as $NH_4^+$ or $Na^+$ or an anion such as $SO_4^{2-}$ or $H_2PO_4^-$ may be added. The presence or absence of such a catalyst component and its amount differ depending upon the starting materials, and are properly selected by considering its effect on the shape and size of the particles.

By hydrolyzing the organometallic compound in the alcoholic solution under suitable conditions as stated above, a monodispersed suspension of fine particles of the hydrate [to be referred to fine hydrate particles (a)] can be obtained. Furthermore, by selecting the concentration of the starting material, the reaction temperature, the concentration of water, the type of the alcohol, the type of the solvent and the type and concentration of the catalyst within preferred ranges, the fine hydrate particles (a) can be obtained as uniform spherical particles having an average particle diameter within the range of 0.15 to 5 micrometers, preferably 0.18 to 5 micrometers, more preferably 0.2 to 5 micrometers and a relative particle size standard deviation of 1 to 1.5, preferably 1 to 1.3.

The fine hydrate particles (a) sometimes have bonded thereto part of the organic groups derived from the starting materials, or contain the catalyst component adsorbed thereon. Depending on the starting material, the fine hydrate particles (a) may partly be crystallized. But most of it is amorphous.

The resulting suspension of the fine hydrate particles (a) in the alcoholic solution is then converted to a glycol suspension of the fine hydrate particles (a) by substituting the glycol (B) for the alcoholic solvent in the suspension.

Preferred examples of the glycol (B) are those having 2 to 8 carbon atoms and two hydroxyl groups, such as ethylene glycol, 1,4-butanediol, neopentyl glycol, propylene glycol and diethylene glycol.

The alcoholic solvent denotes a solvent composed of the alcohol used in the first step [including the glycol (B)], an organic solvent, water added in an amount exceeding the hydrolytically equivalent amount, volatile components in the catalyst and organic materials produced as by-products from the hydrolyzed organometallic compound.

Specific methods of solvent substitution include, for example, (1) a method which comprises separating the fine hydrate particles (a) in their suspension in the alcoholic solution from the alcoholic solvent, by sedimentation, centrifugation, etc. and re-suspending it in the glycol (B), and (2) a method which comprises distilling the alcoholic solvent from the suspension of the fine hydrate particles (a) in the alcoholic solution in the presence of the glycol (B) to obtain a glycol suspension of the fine hydrate particles. The method (2) is preferred because it can prevent agglomeration of the particles during the separating step to a greater degree.

The surface of the fine hydrate particles (2) obtained in the first step are changeable and active because the organic groups derived from the starting material partly remain bonded to it, or the catalyst components are adsorbed on it. This is the matter in respect of which fine silica particles differ greatly from the particles produced from water glass.

The purpose of causing the glycol to be present in the method (2) is twofold. A first purpose is to contact the surface of the fine particles in an active condition with the glycol thereby increasing the affinity of the surface for the glycol and increasing the effect of the heat-treatment in the third step. A second purpose is to prevent agglomeration of the fine particles. It is not clear why agglomeration can be prevented by the presence of the glycol, but it is presumed that the glycol exerts a fine particle protecting action and an action of preventing drying of the suspension on an evaporation wall surface because of its affinity for the surface of the fine hydrate particles (because the particles are obtained by a specified method as in the first step). When the alcoholic solvent is partly distilled from the suspension in an alcoholic solution containing no glycol, agglomeration of the fine hydrate particles is observed at this stage. This will be evidence that the surface of the fine particles is active and changeable.

When the alcohol used in the first step contains part of the glycol (B), the resulting suspension may be subjected directly to the second step. The temperature of the suspension at which the glycol suspension is formed is not particularly restricted, but is suitably 50° to 250° C. The pressure in the system may be reduced, atmospheric or elevated pressure.

In the second step, the methods (1) and (2) may also be used jointly.

The suitable amount of the glycol (B) used to form the glycol suspension of the fine hydrate particles (a) is 0.5 to 100 times the weight of the fine hydrate particles calculated as oxide.

The alcoholic solvent other than the glycol may remain in an amount of not more than 30% by weight in the solvent of the resulting glycol suspension. When the alcoholic solvent contains at least 70% by weight of the glycol at the end of the first step, the second step may be omitted.

To prevent formation of agglomerated particles, it is effective to control the activity of the surface of the fine particles by adding a coupling agent to the suspension of the particles in the alcoholic solution and subjecting the surface of the fine hydrate particles to a coupling treatment. Any coupling agent may be used for this purpose which contains at least one non-hydrolyzable organic group and at least one hydrolyzable group in the molecule. Silane-, titanate- and aluminum-type coupling agents which are readily available are preferably used. Examples of the silane coupling agents include alkoxysilanes having at least one (substituted) alkyl group, (substituted) phenyl group or vinyl group in the molecule such as methyltrimethoxysilane, phenyltrimethoxysilane, benzyltriethoxysilane, methyltriisopropoxysilane, 3-chloropropyltrimethoxysilane, dimethoxydimethylsilane, diethoxymethylphenylsilane, ethoxytrimethylsilane, 3-aminopropyltriethoxysilane, 3-(2-aminoethylaminopropyl)trimethoxysilane, 3-glycidoxypropyltrimethoxysilane, allyltriethoxysilane and vinyltriethoxysilane; chlorosilanes such as trimethylchlorosilane and diethyldichlorosilane; and acetoxysilanes such as acetoxytriethylsilane, diacetoxydiphenylsilane and triacetoxyvinylsilane. Examples of the titanate coupling agent include isopropyltriisostearoyl titanate and bis(dioctylpyrophosphate) oxyacetate titanate. Examples of the aluminum coupling agent are acetoalkoxyaluminum diisopropylate. When an alkoxide or its derivative is used as the organometallic compound in the first step, it is especially preferable to use a coupling agent containing an alkoxy group as the hydrolyzable group because its reactivity is high.

The amount of the coupling agent added is 0.1 to 10% by weight, preferably 0.5 to 5% by weight, based on the weight of the fine particles calculated as oxide. If its amount is lower than the lower limit, the effect of the coupling agent is small. Amounts above the upper limit are effective but not economical.

The temperature for the coupling treatment is 0° to 100° C., preferably the temperature employed in the first step.

In the third step, the glycol suspension of the fine hydrate particles (a) produced in the second step is heat-treated to produce a monodispersed glycol suspension of the fine oxide particles (c). This heat-treatment prevents agglomeration of the fine particles and strikingly increases the dispersion stability of the fine particles in the glycol suspension.

The glycol monodispersed suspension obtained by this invention is stable over a wide pH range. In the present invention, the term "excellent dispersion stability" means that when the glycol monodispersed suspension is stored at temperatures near room temperature without stirring, the particles do not separate nor sediment or even if the particles precipitate during storage, they are readily monodispersed again by stirring, and that when the monodispersed suspension is at room temperature is abruptly placed in an atmosphere kept at a high temperature such as 200° C. or higher, the particles are neither agglomerated nor gelled.

When the pH of a slurry obtained by mixing a glycol monodispersed suspension having a slurry concentration of 20% by weight with the same weight of deionized water is measured, the glycol monodispersed suspension showed stable dispersibility at a pH in the range of 4 to 10. What is noteworthy is that the glycol monodispersed suspension is stable even in an acidic range of pH 4-7. No glycol monodispersed suspension of fine particles has been known so far which is stable over such a wide pH range. The glycol monodispersed suspension obtained by the method of this invention does not require any pH controlling agent which becomes an impurity. If the pH of the suspension is less than 4, the particles are liable to be agglomerated. If it exceeds 10, the particles tend to be gelled.

The fine inorganic oxide particles, as referred to in this invention, may include those partly containing the hydroxyl group, the bonded glycol group, the adsorbed catalyst, water of adsorption, etc., and are defined as fine particles having a higher degree of dehydration than the fine hydrate particles (a) obtained in the first and second steps.

The reason for the increased dispersion stability of the fine particles in the third step is not entirely clear. It is presumably because the glycol group is effectively bonded to the surface of the fine particles. Specifically, it is presumed that fine particles having an active surface are formed in the first step, and the affinity of the fine particles for the glycol is enhanced in the second step, and a reaction involving dehydration and bonding of the active metal hydroxide group to the glycol or a substitution reaction between the active organic group and the glycol takes place efficiently on the surface of the fine hydrate particles.

The amount of the bonded glycol, measured after the free glycol is completely removed by drying a sample of the monodispersed glycol suspension in vacuum at 50° C., is 0.003 to 5 millimoles per gram of the fine oxide particles (c). It varies depending upon the type of the fine particles, the reaction conditions in the first step and the heat-treatment conditions in the third step, etc. If the amount of the bonded glycol is 0.3 to 0.5 millimol, a more stable monodispersed glycol suspension is obtained.

The pressure at the time of heat-treatment may be reduced, atmospheric or elevated pressure, but reduced or atmospheric pressures are advantageous because the operation is easy to carry out under these pressures. The preferred heat-treatment temperature (T, °C.) is preferably $70 \leq T \leq TB+10$, more preferably $TB \leq T \leq TB+10$, in which TB is the boiling point of the glycol (B) under the operating pressure ($TB \geq 70$). If there is only one glycol (B), TB means the boiling point of that glycol. If it is a mixture of two or more glycol, TB means the boiling point obtained from a pressure-boiling point curve drawn on the basis of the mixed glycol. For example, when the glycol (B) is ethylene glycol, TB is 197.6 (atmospheric pressure), 100 (18 torr), 75 (4.1 torr), etc. The boiling points of other glycols can be likewise determined if the pressure is set.

T sometimes exceeds TB because the boiling point of the glycol rises owing to the fine particles. Hence, the upper limit (TB+10) °C. of the heat-treatment temperature (T °C.) is determined by considering this rise in boiling point. The higher the heat-treatment temperature, the higher the dispersion stabilizing effect within a shorter treating time. Lower temperatures require a longer period of time. If T is lower than 70° C., the heat-treatment effect is undesirably low.

Preferably, the heat-treatment is carried out at the boiling point of the suspension or while blowing an inert gas into the treatment system in order to promote distillation of water resulting from dehydration of the fine hydrate particles, water formed from the reaction of the hydroxyl group with the glycol, an organic matter formed by the elimination of the organic group bonded partly to the fine hydrate particles (a) and the remaining alcoholic solvent. When T is lower than TB, the flowing of an inert gas such as $N_2$ is especially effective.

By the above procedure, a monodispersed glycol suspension of the fine inorganic oxide particles is finally obtained. In this final monodispersed suspension, the alcoholic solvent other than the glycol may remain in an amount of not more than about 20% by weight based on the entire solvents.

From an economical standpoint, the second and third steps may be simultaneously carried out without apparently separating them from each other.

If desired, after the third step, minor amounts of coarse particles, agglomerated particles or foreign materials included in the process may be removed from the glycol suspension by filtration, centrifugation, etc.

The monodispersed glycol suspension of the fine inorganic oxide particles (c) is useful as a raw material for the production of a polyester film having improved slipperiness. When a film is formed from a polyester obtained by using the monodispersed glycol suspension, uniform fine raised and depressed parts can be easily and accurately formed on the surface of the film because the fine particles in the glycol suspension are spherical and have a sharp particle size dispersion. Furthermore, since the glycol suspension contains little or no agglomerated or coarse particles, no irregular protrusions form on the film surface. Moreover, during the polyester synthesis, the organic hydroxyl groups of the glycol bonded to the surface of the fine particles react with the dicarboxylic acid such as terephthalic acid, whereby affinity arises between the fine particles and the polyester and the formation of voids can be prevented. In addition, since the monodispersed glycol suspension has excellent dispersion stability characteristics such as excellent storage stability and thermal stability, the particles do not sediment and agglomerate even upon long-term storage or even when added during a polymerization step at high temperatures. Thus, it lends itself to easy handling when used for polyester synthesis, and agglomeration of the particles by thermal shock at the time of addition does not appreciably occur.

Polyesters to which the invention is applicable are polyesters derived from terephthalic acid or 2,6-naphthalene dicarboxylic acid, or its ester-forming derivative as a main dicarboxylic acid component and a glycol such as ethylene glycol or 1,4-butanediol or its ester-forming derivative as a main glycol component. These polyesters are not limited in composition and the method of production, and may contain other polyesters blended therewith.

The monodispersed glycol suspension of the fine inorganic oxide particles may be added at any stage of polyester production. Preferably, it is added at a stage ranging from the initial period of esterification or ester-interchange reaction of the dicarboxylic acid component and the glycol component to the end of the reaction to form a prepolymer, or at an early stage of polycondensing the prepolymer.

The amount of the fine oxide particles (c) added is usually 0.005 to 2% by weight based on the weight of the polyester. If it is less than 0.005% by weight, the effect of these particles on slipperiness is insufficient. If it is larger than 2% by weight, the physical properties such as tensile strength of the finally obtained film are undersirably deteriorated.

The polyester film having improved slipperiness produced in accordance with this invention has excellent abrasion resistance and lends itself to excellent coating or vacuum-deposition of a magnetic layer in the production of magnetic tapes. Hence, it is especially suitable for production of magnetic tapes having excellent electromagnetic converting characteristics.

The following examples illustrate the present invention in greater detail.

The shape, average diameter, relative particle size standard deviation, specific surface area, dispersion stability, crystallinity, and adsorption water content of the fine inorganic particles in the monodisperse glycol suspension, and the amount of the glycol bonded thereto, the presence of agglomerated particles and the pH of the monodispersed suspension were measured or determined by the following methods.

SHAPE OF THE PARTICLES

The shape of the particles was determined by observation under an electron microscope (magnification 50,000×).

AVERAGE PARTICLE DIAMETER AND THE RELATIVE PARTICLE SIZE STANDARD DEVIATION

The particle diameters of 100 particles arbitrarily selected from an electron micrograph (50,000×) of the fine particles were actually measured, and the average particle diameter and the relative particle size standard deviation were calculated from the following equations.

$$\text{Average particle diameter } (\overline{X}) = \frac{\sum_{i=1}^{n} Xi}{n}$$

$$\text{Relative particle size standard deviation} = \frac{\overline{X} + \sigma_{n-1}}{\overline{X}}$$

In the above equation, $Xi$ is the diameter of the ith particle, n is 100, and $$\sigma_{n-1} = \sqrt{\frac{\sum_{i=1}^{n} (\overline{X} - Xi)^2}{n - 1}}$$

CRYSTALLINITY OF THE FINE PARTICLES

An aliquot of the suspensions of the fine oxide particles or the fine hydrate particles was dried in vacuum at 50° C. to remove completely volatile components such as the alcoholic solvent and glycol not bonded to the fine particles and to prepare a powder sample of the fine particles. The crystallinity of the powder sample was determined by X-ray diffractometry.

CONTENT OF WATER OF ADSORPTION

The powder sample obtained as above was weighed into a porcelain container (let the weight of the sample at this time be A g). The container was placed in an oven at 200° C. through which dry air was circulating, and maintained for 5 hours. After cooling, the container was weighed (let the weight of the sample at this time be B g). The content of water of adsorption in the fine particles was calculated in accordance with the following equation.

$$\text{Content of water of adsorption} = \frac{A - B}{A} \times 100 \, (\%)$$

SPECIFIC SURFACE AREA

The specific surface area of the powder sample obtained as above was measured by the BET method.

AMOUNT OF THE GLYCOL BONDED

About 1 g of the powder obtained as above was precisely weighed, and added to 50 ml of a 0.05N aqueous solution of sodium hydroxide. The mixture was stirred at room temperature for 10 hours (whereby the glycol bonded to the surface of the fine particles was completely hydrolyzed and extracted into the aqueous solution). The fine particles in the resulting suspension were separated by an ultracentrifuge, and the amount of the glycol in the clear liquid was quantitatively determined by gas chromatography. In this manner, the amount of the glycol bonded to 1 g of the fine particles was measured.

PRESENCE OF AGGLOMERATED PARTICLES

The glycol suspension of the fine inorganic oxide particles was observed under an optical microscope (magnification 1,000×) to determine whether agglomerated particles existed in it.

DISPERSION STABILITY (1) Stability with time

The glycol suspension of the fine inorganic oxide particles was placed in a sealed glass container and left to stand. The presence or absence of a particle sedimented layer or a supernatant layer was periodically checked by visual observation, and the dispersion stability was evaluated on the following standard.

X: The sedimented layer or the supernatant layer was observed after standing for 1 day.

○: The sedimented layer or the supernatant layer was observed after standing for 2 days to 1 month.

⊚: No sedimented layer nor supernatant layer was observed after standing for more than 1 month.

(2) Thermal stability

The sample put in a sealed glass container was immersed in an oil bath set at 250° C., and maintained for 1 hour. Then, the sample was taken out from the oil bath, and cooled to room temperature. The state of the sample was observed. The result was evaluated by X which means that the particles in the sample were agglomerated or the sample was gelled, and ○ which means that there was no such change in the sample.

pH OF THE GLYCOL MONODISPERSED SUSPENSION

A glycol monodispersed suspension in which the concentration of the fine particles was adjusted to 20% by weight was well mixed with the same weight of deionized water, and after the lapse of 10 minutes the pH of the mixture was measured at 25° C. A sample in which the concentration of the fine particles exceeded 20% by weight was diluted to 20% by weight with the same glycol. If the concentration is less than 20% by weight, the glycol suspension was concentrated under reduced pressure in an atmosphere of nitrogen to adjust the concentration of the fine particles to 20% by weight.

PRODUCTION OF A SUSPENSION OF FINE HYDRATE PARTICLES IN AN ALCOHOLIC SOLUTION

EXAMPLE 1-(1)

Methanol (16 liters) and 1.5 kg of a 28% aqueous solution of ammonia were fed into a 30 liter glass reactor equipped with a stirrer, a dropping port and a thermometer, and mixed. The mixture was adjusted to 20°±0.5° C., and with stirring, a solution of 1.0 kg of tetramethyl silicate in 2 liters of methanol was added dropwise from the dropping port over 1 hour. After the addition, the mixture was continuously stirred for 2 hours to produce a suspension of fine silica hydrate particles ($1a_1$) in an alcoholic solution. The concentrations of the starting materials based on the total weight of the final solution were 0.32 mole/liter for tetramethyl silicate, 2.90 moles/liter for water, and 1.19 moles/liter for ammonia. The reaction conditions and the results of analysis of the fine particles are shown in Table 1.

EXAMPLES 1-(2)–1-(7)

Example 1-(1) was repeated except that the type of the organometallic compound, the type of the alcohol, the concentrations of the starting materials based on the total weight of the final solution and the reaction temperature were changed as shown in Table 1. There were produced suspensions of fine silica hydrate particles ($2a_1$) to ($3a_1$), a suspension of fine titania hydrate particles ($4a_1$), a suspension of fine zirconia hydrate particles ($5a_1$), a suspension of fine alumina hydrate particles ($6a_1$) and a suspension of fine slilica-alumina compound hydrate particles ($7a_1$). The reaction conditions and the results of analysis are shown in Table 1.

PRODUCTION OF A GLYCOL SUSPENSION OF FINE HYDRATE PARTICLES

EXAMPLE 2-(1)

An evaporation device was used which consisted of a 5-liter glass evaporation kettle equipped with a stirrer, a dropping port, a thermometer and a distillation gas outlet and adapted to be heated by a heat medium and further equipped with a distillation gas condenser, a pressure reduction suction opening and a condensed liquid receiver following the distillation gas outlet. Ethylene glycol (1.2 kg) was charged into the evaporation kettle. With stirring, the pressure of the system was maintained at 150 torr, and the temperature of the heat medium was kept at 120° C. Then, from the dropping port, 16.7 kg of the suspension of fine silica hydrate particles ($1a_1$) produced in Example 1-(1) was continuously fed to distill the alcoholic solvent containing methanol, water, ammonia and ethylene glycol. After the end of feeding the suspension, the heating was continued and when the temperature of the system reached 55° C., the distillation of the solvent was stopped. As a result, a glycol suspension of the fine silica hydrate particles ($1a_2$) was produced.

The solvent resulting from removing the fine particles from the suspension contained 13% by weight of an alcoholic solvent (mainly methanol and water) other than ethylene glycol.

The conditions for production of the glycol suspension and the results of analysis of the fine particles are shown in Table 2. The suspension had poor dispersion stability.

EXAMPLES 2-(2)–2-(7)

Example 2-(1) was repeated except that the suspensions of the fine hydrate particles ($2a_1$) to ($7a_1$) in the alcoholic solutions produced in Examples 1-(2) to 1-(7) were used and the type of the glycol and the treating conditions were changed as indicated in Table 2. The results are shown in Table 2. The dispersion stabilities of these suspensions were evaluated as or higher.

EXAMPLE 2-(8)

Ethylene glycol (1.0 kg) was added to 16.7 kg of the suspension of the fine silica hydrate particles ($1a_1$) in the alcoholic solution obtained in Example 1-(1), and they were well mixed. The entire mixture was centrifuged to remove the alcoholic solvents, and the sedimented fine particles were dispersed in 1.0 kg of ethylene glycol to prepare a glycol suspension of the fine silica hydrate particles ($1_1a_2$). The amount of the glycol in the glycol suspension was 2.6 times the weight of the fine silica hydrate particles calculated as oxide, and it contained 28% by weight of an alcoholic solvent other than the glycol. The suspension had poor dispersion stability.

EXAMPLE 2-(9)

The suspension (16.7 kg) of the fine silica hydrate particles ($1a_1$) produced in Example 1-(1) was mixed with 2.0 g (0.5% by weight based on the weight of the fine silica hydrate particles calculated as oxide) of phenyltrimethoxysilane as a silane coupling agent, and the mixture was stirred at room temperature for 30 minutes to perform silane coupling treatment. The treated fine particles were then mixed with 1.2 kg of ethylene glycol to form a glycol suspension of the fine particles.

Then, by using the same device as in Example 2-(1), 2 liters of the glycol suspension was initially charged into the evaporation kettle. The system was heated while maintaining the pressure in the system at 150 torr to distill the alcoholic solvent. At the same time, the remainder of the glycol suspension was continuously fed, and the mixture was continuously heated after the end of the feeding. When the temperature of the inside of the evaporation device reached 55° C., the distillation of the solvent was stopped. Thus, a glycol suspension of the fine silica hydrate particles ($1_2a_2$) was produced. The results are shown in Table 2. This dispersion had poor dispersion stability.

EXAMPLES 2-(10)–2-(12)

Example 2-(9) was repeated except that the type and amount of the coupling agent were changed as shown in Table 2. As a result, glycol suspensions of fine silica hydrate particles ($1_3a_2$), ($1_4a_2$) and ($1_5a_2$) were produced. The results are shown in Table 2.

PRODUCTION OF A MONODISPERSED GLYCOL SUSPENSION OF FINE INORGANIC OXIDE PARTICLES

EXAMPLE 3-(1)

Figure 1:
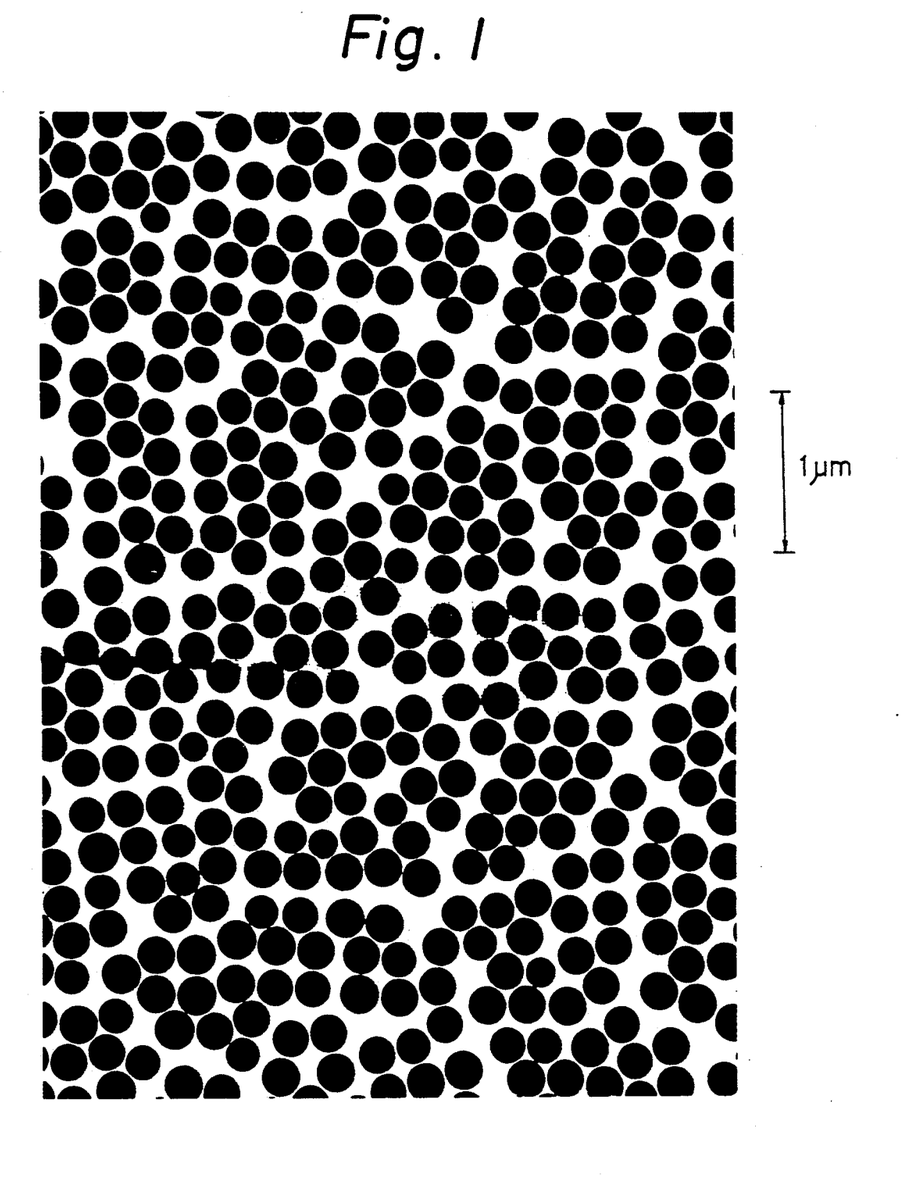
FIG. 1, is a transmission electron micrograph (magnification 50,000X) of fine inorganic oxide particles in the monodispersed glycol suspension of the invention obtained in Example 3-(1) given hereinbelow.

The glycol suspension of fine silica hydrate particles ($1a_2$) produced in Example 2-(1) was fed into the same device as used in Example 2-(1), and heated with a heat medium under atmospheric pressure. It was maintained for 30 minutes at an inside temperature of 199° C. (the boiling point of ethylene glycol under atmospheric pressure is 197.6° C.) to produce a monodispersed glycol suspension of fine silica particles (1c). The alcoholic solvent was distilled during temperature elevation, and part of ethylene glycol was distilled during temperature maintenance. The heat-treatment conditions, the properties of the final monodispersed glycol suspension, and the results of analysis of the fine particles are shown in Table 3. A transmission electron micrograph of the particles in the monodispersed glycol suspension is attached to this application. The fine particles had a sharp particle size distribution, and no agglomerated particles were observed.

EXAMPLES 3-(2)–3-(8)

Monodispersed glycol suspensions of fine inorganic oxide particles ($1_1c$) to ($7c$) were produced in the same way as in Example 3-(1) except that the type of the glycol suspension and the heat-treatment conditions were changed as shown in Table 3. The results are shown in Table 3. The dispersion stabilities of the resulting monodispersed suspensions were higher than those of the starting glycol suspension.

EXAMPLES 3-(9)–3-(11)

Example 3-1 was repeated except that the treating temperature was changed as shown in Table 3. The results are shown in Table 3.

EXAMPLES 3-(12)–3-(15)

Example 3-(1) was repeated except that the glycol suspensions of the fine silica hydrate particles ($1_2a_2$) to ($1_5a_2$) obtained in Examples 2-(9) to 2-(12) were treated at an inside temperature of 120° C. As a result, monodispersed glycol suspensions of ($1_2c$) to ($1_5c$) were produced. The results are shown in Table 3.

Comparative Example 1

Using the same device as used in Example 2-(1), the suspension of the fine silica hydrate particles ($1a_1$) in the alcoholic solution obtained in Example 1-(1) was treated in the absence of the glycol, and the alcoholic solvent was distilled at 150 torr. The resulting powder of ($1a_1$) was suspended in ethylene glycol in a concentration of 27.3% by weight. The suspension was heat-treated as in Example 3-(1) to obtain a glycol slurry of the fine silica particles. The dispersion stability of the glycol slurry was evaluated as ◯, but it contained many agglomerated particles.

Comparative Example 2

Example 2-(1) was repeated except that stearyl alcohol was used instead of ethylene glycol. Thus, a stearyl alcohol suspension of silica hydrate fine particles ($1_6a_2$) was produced. In the same apparatus as in Example 2-(1), the heat medium was kept at 200° C., and the suspension was placed under a gradually elevated pressure and finally under 5 torr. Thus, stearyl alcohol was evaporated and a powder of fine silica particles ($1_6c$) was obtained. The amount of stearyl alcohol bonded to ($1_6c$) was measured by the same method as the method of measuring the amount of glycol bonded, and was found to be 1.7 mmoles/g. The powder ($1_6c$) was added to ethylene glycol, but became a floc and could not be dispersed even by agitating the mixture.

Comparative Example 3

By using sodium silicate as a raw material, a silica aquasol having a particle diameter of 0.12 micrometer, an $SiO_2:Na_2O$ mole ratio of 6000:1 and an $SiO_2$ concentration of 50% by weight was prepared by the method described in U.S. Pat. No. 2,921,913. Then, ethylene glycol in an amount 2.5 times the weight of the aquasol was added to the aquasol. The mixture was heated under atmospheric pressure to evaporate water. The mixture was heated finally to 198° C. to produce a 20% by weight ethylene glycol dispersion of the silica particles. The resulting dispersion had a pH of 7.8, and the amount of ethylene glycol bound to the surface of the fine particles was 1.3 millimoles/g. The stability of the dispersion with time was ◯, but its thermal stability was X.

Comparative Example 4

In the same way as in Comparative Example 3, a silica aquasol having a particle diameter of 0.12 micrometer, an $SiO_2:Na_2O$ mole ratio of 6000:1 and an $SiO_2$ concentration of 50% by weight was prepared. By passing the aquasol through a hydrogen ion-type cation exchange resin, a silica aquasol having an $SiO_2:Na_2O$ mole ratio of 40,000:1 was prepared. A 20% by weight ethylene glycol dispersion of silica particles (9c) was produced in the same way as in Comparative Example 3 except that this de-alkalized silica aquasol was used. The pH of the resulting dispersion was 6.7, and the amount of ethylene glycol bonded to the surface of the fine particles was 1.5 millimoles/g. Both the stability with time and thermal stability of the ethylene glycol dispersion were evaluated as X.

Comparative Example 5

A suspension of silica hydrate fine particles was produced as in Example 1-(1) except that the concentration of the organometallic compound was changed. Then, as in Example 2-(1) and Example 3-(1), a 27.5% by weight ethylene glycol monodispersed suspension of amorphous spherical fine silica particles (10c) having an average particle diameter of 0.12 micrometer and a standard deviation of 1.06 was produced. The dispersion had a pH of 5.3, and the amount of ethylene glycol bonded to the surface of the fine particles was 1.5 millimoles/g. The dispersion as a stability with time of ⊚, and a thermal stability of X.

Comparative Example 6

A suspension of silica hydrate fine particles was prepared as in Example 1-(3) except that the concentration of the organometallic compound was changed. Then, as in Example 2-(3) and Example 3-(3), a 43.0% by weight 1,4-butanediol monodispersed suspension of amorphous spherical fine silica particles (11c) having an average particle diameter of 6.0 micrometers and a standard deviation of 1.10 was prepared. The suspension had a pH of 5.9, and the amount of 1,4-butanediol bonded to the surface of the fine particles was 0.005 millimoles/g. The suspension had a stability with time of X, and a thermal stability of ◯.

EXAMPLE 4

Manganese acetate tetrahydrate (0.04 part by weight) as a catalyst was added to 100 parts by weight of dimethyl terephthalate and 70 parts by weight of ethylene glycol. The mixture was heated to 230° C. and methanol was distilled off to perform ester interchange reaction. Then, 0.37 part by weight (0.1% by weight of silica particles based on the polyester) of the monodispersed ethylene glycol dispersion of the fine silica particles (1c) produced in Example 3-(1) and 0.03 part by weight of antimony oxide were added with stirring. The mixture was heated finally to 280° C. under less than 1 torr to perform polycondensation. The resulting polyester was extruded into a sheet form by an extruder kept at 290° C. The sheet was stretched to 3.5 times longitudinally at 90° C., then stretched to 4 times transversely at 100° C., and heat-treated at 210° C. for 10 minutes to obtain a biaxially oriented polyester film having a thickness of 10 micrometers and containing the fine silica particles (1c).

Polyester films containing fine inorganic oxide particles were prepared in the same way as above except that the monodispersed glycol suspensions of fine silica particles (1c), (2c), (3c) and ($1_1$c) to ($1_5$c), fine titania particles (4c), fine zirconia particles (5c), fine alumina particles (6c) and fine silica-alumina compound particles (7c) obtained in Examples 3-(2) to 3-(15) were used.

The surfaces of these polyester films were observed by using their electron micrographs (5000×). They had no agglomerated particles, and uniform particles were dispersed. Furthermore, no void existed around the particles, and the adhesion of the particles to the polyester was good.

These films had a coefficient of static friction, measured by a slip tester in accordance with ASTM-D-1894B, of less than 1.0, showing excellent slipperiness.

Comparative Example 7

Example 4 was repeated except that the glycol suspension of fine silica hydrate particles ($1_1a_2$) obtained in Example 2-(8) was used instead of the monodispersed glycol suspension of inorganic oxide particles obtained in Example 3-(1). The surface of the resulting polyester film containing the fine silica hydrate particles ($1_1a_2$) was observed by using an electron micrograph of the film surface. Agglomerated particles were seen to exist, and voids existed around the particles.

Comparative Example 8

Example 4 was repeated except that the glycol slurry of fine silica particles obtained in Comparative Example 1 was used instead of the monodispersed glycol suspension used in Example 4. The surface of the resulting polyester film containing the fine silica particles was observed by using an electron micrograph of the film surface. Many agglomerated particles were seen to exist.

TABLE 1

| Example | Fine hydrate particles obtained as a suspension | Organometallic compound | Alcohol | Concentrations of the starting materials based on the final solution (mole/liter) | | | Reaction temperature | Crystallinity |
|---|---|---|---|---|---|---|---|---|
| | | | | Organometallic compound | Water | Catalyst | | |
| 1-(1) | silica hydrate particles ($1a_1$) | Si(OCH$_3$)$_4$ | methanol | 0.32 | 2.90 | NH$_3$ (1.19) | 20 | amorphous |
| 1-(2) | silica hydrate particles ($2a_1$) | low condensation product of Si(OC$_2$H$_5$)$_4$ (tetramer on an average) | ethylene glycol/ethanol (2/98 by volume) | 0.21 | 15.50 | NH$_3$ (7.00) | 45 | amorphous |
| 1-(3) | silica hydrate particles ($3a_1$) | Si(O-n-C$_5$H$_{11}$)$_4$ | n-butanol | 0.43 | 21.30 | NH$_3$ (9.40) | 20 | amorphous |
| 1-(4) | titania hydrate particles ($4a_1$) | Ti(O-iso-C$_3$H$_7$)$_4$ | methanol | 0.15 | 0.45 | — | 20 | amorphous |
| 1-(5) | zirconia hydrate particles ($5a_1$) | Zr(O-n-C$_4$H$_9$)$_4$ | n-propanol | 0.25 | 1.20 | — | 25 | amorphous |
| 1-(6) | alumina hydrate particles ($6a_1$) | Al(O-iso-C$_3$H$_7$)$_3$ | isopropanol | 0.35 | 6.31 | NH$_3$ (2.10) | 15 | weak boehmite phase |
| 1-(7) | silica-alumina compound hydrate particles ($7a_1$) | Si(OC$_2$H$_5$)$_4$ Al(O-iso-C$_3$H$_7$)$_3$ | isopropanol | 0.24 0.12 | 25.50 | NH$_3$ (3.20 | 25 | amorphous |

TABLE 2-a

| Example | Glycol suspension of fine hydrate particles |
|---|---|
| 2-(1) | silica hydrate particles ($1a_2$) |
| 2-(2) | silica hydrate particles ($2a_2$) |
| 2-(3) | silica hydrate particles ($3a_2$) |
| 2-(4) | titania hydrate particles ($4a_2$) |
| 2-(5) | zirconia hydrate particles ($5a_2$) |
| 2-(6) | alumina hydrate particles ($6a_2$) |
| 2-(7) | silica-alumina hydrate particles ($7a_2$) |
| 2-(9) | silica hydrate particles ($1_2a_2$) |
| 2-(10) | silica hydrate particles ($1_3a_2$) |
| 2-(11) | silica hydrate particles ($1_4a_2$) |
| 2-(12) | silica hydrate particles ($1_5a_2$) |

TABLE 2-b

| Example | Fine hydrate particles used as a suspension in an alcoholic solvent | Final temperature in the kettle (°C.) | Pressure | Glycol present | Amount of the glycol used (*1) |
|---|---|---|---|---|---|
| 2-(1) | silica hydrate particles (1a₁) | 55 | 150 torr | ethylene glycol | 3.0 |
| 2-(2) | silica hydrate particles (2a₁) | 150 | atmospheric pressure | ethylene glycol | 9.1 |
| 2-(3) | silica hydrate particles (3a₁) | 160 | atmospheric pressure | propylene glycol | 1.5 |
| 2-(4) | titania hydrate particles (4a₁) | 110 | 400 torr | 1,4-butanediol | 32.3 |
| 2-(5) | zirconia hydrate particles (5a₁) | 150 | atmospheric pressure | ethylene glycol | 13.3 |
| 2-(6) | alumina hydrate particles (6a₁) | 140 | atmospheric pressure | ethylene glycol | 5.7 |
| 2-(7) | silica-alumina hydrate particles (7a₁) | 125 | atmospheric pressure | ethylene glycol | 9.0 |
| 2-(9) | silica hydrate particles (1a₁) | 55 | 150 torr | ethylene glycol | 3.0 |
| 2-(10) | silica hydrate particles (1a₁) | 55 | 150 torr | ethylene glycol | 3.0 |
| 2-(11) | silica hydrate particles (1a₁) | 55 | 150 torr | ethylene glycol | 3.0 |
| 2-(12) | silica hydrate particles (1a₁) | 55 | 150 torr | ethylene glycol | 3.0 |

(*1) Amount in times the weight of the fine hydrate particles calculated as oxide

TABLE 2-c

| Example | Glycol suspension Content of the alcoholic solvent other than glycol (wt. %)(*2) | Amount of water adsorbed on the fine particles (wt. %) | Coupling agent Type | Amount (wt. %) (*3) |
|---|---|---|---|---|
| 2-(1) | 13 | 13 | — | — |
| 2-(2) | 8 | 5 | — | — |
| 2-(3) | 5 | 5 | — | — |
| 2-(4) | 6 | 19 | — | — |
| 2-(5) | 7 | 14 | — | — |
| 2-(6) | 10 | 21 | — | — |
| 2-(7) | 17 | 18 | — | — |
| 2-(9) | 13 | 13 | phenyltrimethoxysilane | 0.5 |
| 2-(10) | 13 | 13 | γ-aminopropylmethyldiethoxysilane | 2.0 |
| 2-(11) | 13 | 13 | acetoalkoxyaluminum diisopropylate | 3.0 |
| 2-(12) | 13 | 13 | isopropyltriisostearoyl titanate | 5.0 |

(*2) Content of the alcoholic solvent other than the glycol contained in the solvents resulting from removal of the fine particles from the suspension
(*3) based on the weight of the hydrate particles calculated as oxide

TABLE 3-a

| Example | Monodispersed glycol suspension of fine inorganic oxide particles obtained | Glycol suspension of fine hydrate particles used | Heat-treatment conditions Temperature (°C.) | Pressure |
|---|---|---|---|---|
| 3-(1) | silica particles (1c) (ethylene glycol) | ethylene glycol suspension of (1a₂) | 199 | atmospheric pressure |
| 3-(2) | silica particles (2c) (ethylene glycol) | ethylene glycol suspension of (2a₂) | 91 | 10 torr |
| 3-(3) | silica particles (3c) (propylene glycol) | propylene glycol suspension of (3a₂) | 83 | 8 torr |
| 3-(4) | titania particles (4c) (1,4-butanediol) | 1,4-butanediol suspension of (4a₂) | 230 | atmospheric pressure |
| 3-(5) | zirconia particles (5c) (ethylene glycol) | ethylene glycol suspension of (5a₂) | 198 | atmospheric pressure |
| 3-(6) | alumina particles (6c) (ethylene glycol) | ethylene glycol suspension of (6a₂) | 142 | 100 torr |
| 3-(7) | silica-alumina particles (7c) (ethylene glycol) | ethylene glycol suspension of (7a₂) | 180 | atmospheric pressure |
| 3-(8) | silica particles (1₁c) (ethylene glycol) | ethylene glycol suspension of (1₁a₂) | 200 | atmospheric pressure |
| 3-(9) | silica particles (1c) (ethylene glycol) | ethylene glycol suspension of (1a₂) | 160 | atmospheric pressure |
| 3-(10) | silica particles (1c) (ethylene glycol) | ethylene glycol suspension of (1a₂) | 120 | atmospheric pressure |
| 3-(11) | silica particles (1c) (ethylene glycol) | ethylene glycol suspension of (1a₂) | 80 | atmospheric pressure |
| 3-(12) | silica particles (1₂c) (ethylene glycol) | ethylene glycol suspension of (1₂a₂) | 120 | atmospheric pressure |

TABLE 3-a-continued

| Example | Monodispersed glycol suspension of fine inorganic oxide particles obtained | Glycol suspension of fine hydrate particles used | Heat-treatment conditions Temperature (°C.) | Pressure |
|---|---|---|---|---|
| 3-(13) | silica particles ($1_{3}c$) (ethylene glycol) | ethylene glycol suspension of ($1_{3}a_{2}$) | 120 | atmospheric pressure |
| 3-(14) | silica particles ($1_{4}c$) (ethylene glycol) | ethylene glycol suspension of ($1_{4}a_{2}$) | 120 | atmospheric pressure |
| 3-(15) | silica particles ($1_{5}c$) (ethylene glycol) | ethylene glycol suspension of ($1_{5}a_{2}$) | 120 | atmospheric pressure |

TABLE 3-b

Results of evaluation and analysis of the monodispersed glycol suspension

| Example | Dispersion stability Stability with time | Dispersion stability Thermal stability | Agglomerated particles | Concentration of the fine particles (wt. %)(*4) | Content of the alcoholic solvent other than glycol (wt. %)(*5) | pH |
|---|---|---|---|---|---|---|
| 3-(1) | ◉ | ○ | no | 27.3 | 0 | 5.6 |
| 3-(2) | ◉ | ○ | no | 15.2 | 1 | 4.3 |
| 3-(3) | ○ | ○ | no | 43.1 | 2 | 5.8 |
| 3-(4) | ◉ | ○ | no | 3.5 | 0 | 5.0 |
| 3-(5) | ◉ | ○ | no | 8.4 | 0 | 6.7 |
| 3-(6) | ◉ | ○ | no | 18.8 | 0 | 6.5 |
| 3-(7) | ○ | ○ | no | 12.4 | 3 | 4.2 |
| 3-(8) | ◉ | ○ | no | 31.2 | 0 | 6.0 |
| 3-(9) | ◉ | ○ | no | 27.3 | 1 | 6.2 |
| 3-(10) | ○ | ○ | no | 27.3 | 3 | 6.4 |
| 3-(11) | ○ | ○ | no | 27.3 | 10 | 6.7 |
| 3-(12) | ◉ | ○ | no | 27.3 | 3 | 6.1 |
| 3-(13) | ◉ | ○ | no | 27.3 | 3 | 5.9 |
| 3-(14) | ◉ | ○ | no | 27.3 | 3 | 6.0 |
| 3-(15) | ◉ | ○ | no | 27.3 | 3 | 5.8 |

(*4)Concentration of the fine particles calculated as oxide
(*5)Content of the alcoholic solvent other than the glycol contained in the solvents resulting from removal of the fine particles from the suspension TABLE 3-c Results of analysis of the fine oxide particles

| Example | Shape | Average particle diameter (μm) | Relative standard particle size deviation | Crystallinity | Content of water of adsorption (wt. %) | Specific surface area ($m^2$/g) | Amount of glycol bonded (mmole/g) | Amount of glycol bonded (mmole/$m^2$) |
|---|---|---|---|---|---|---|---|---|
| 3-(1) | spherical | 0.25 | 1.05 | amorphous | 0.1 | 12.2 | 1.9 | 0.16 |
| 3-(2) | spherical | 0.15 | 1.10 | amorphous | 3.3 | 21.3 | 0.3 | 0.014 |
| 3-(3) | spherical | 3.9 | 1.21 | amorphous | 4.1 | 3.4 | 0.005 | 0.001 |
| 3-(4) | spherical | 0.43 | 1.06 | amorphous | 0 | 10.3 | 0.7 | 0.07 |
| 3-(5) | spherical | 0.62 | 1.04 | amorphous | 0.1 | 9.6 | 0.5 | 0.05 |
| 3-(6) | spherical | 0.16 | 1.13 | weak borhmite phase | 7.6 | 41.2 | 0.2 | 0.005 |
| 3-(7) | spherical | 0.18 | 1.07 | amorphous | 2.8 | 37.4 | 1.6 | 0.043 |
| 3-(8) | spherical | 0.25 | 1.05 | amorphous | 0.1 | 12.5 | 2.6 | 0.21 |
| 3-(9) | spherical | 0.25 | 1.05 | amorphous | 0.3 | 12.7 | 1.6 | 0.13 |
| 3-(10) | spherical | 0.25 | 1.05 | amorphous | 6.2 | 11.9 | 1.0 | 0.08 |
| 3-(11) | spherical | 0.25 | 1.05 | amorphous | 12.0 | 12.1 | 0.5 | 0.04 |
| 3-(12) | spherical | 0.25 | 1.05 | amorphous | 6.1 | 12.0 | 0.6 | 0.05 |
| 3-(13) | spherical | 0.25 | 1.05 | amorphous | 6.2 | 12.1 | 0.4 | 0.03 |
| 3-(14) | spherical | 0.25 | 1.05 | amorphous | 6.2 | 11.9 | 0.2 | 0.02 |
| 3-(15) | spherical | 0.25 | 1.05 | amorphous | 6.1 | 11.7 | 0.05 | 0.004 |

What is claimed is:

1. A substantially agglomerate free monodispersed glycol suspension having excellent dispersion stability, comprising a monodispersed suspension in a glycol of spherical fine particles of an amorphous inorganic oxide having an average particle diameter of 0.15 to 5 micrometers and a relative particle size standard deviation of 1.0 to 1.3 and containing glycol bonded to its surface, the amount of the bonded glycol being 0.003 to 5 millimoles per gram of the fine oxide particles, and said monodispersed glycol suspension being obtained by the steps of:

(a) preparing a suspension of fine particles of an amorphous hydrated inorganic oxide in an aqueous monohydric alcoholic solvent by hydrolyzing a hydrolyzable organometallic compound in the aqueous monohydric alcoholic solvent;

(b) preparing a glycol suspension of fine inorganic oxide particles from the suspension of step (a) by substituting a glycol for the monohydric alcoholic solvent; and (c) preparing a monodispersed glycol suspension of fine inorganic oxide particles by heat-treating the suspension of step (b), wherein the heat-treatment temperature (T° C.) is $70 \leq T \leq TB+10$ in which TB represents the boiling point (°C.) of the glycol under the pressure at which the heat-treatment is carried out, and $TB \geq 70$.

2. The monodispersed glycol suspension of claim 1 wherein the inorganic oxide is composed mainly of silica, titania, alumina, zirconia or a composite oxide thereof.

3. The monodispersed glycol suspension of claim 1 wherein the glycol has 2 to 8 carbon atoms and 2 hydroxyl groups.

4. The monodispersed glycol suspension of claim 3 wherein the glycol is ethylene glycol.

5. The suspension of claim 1 which is dispersion-stable at a pH in the range of from about 4 to about 10.

* * * * *